(12) United States Patent
Padervand

(10) Patent No.: US 11,014,082 B2
(45) Date of Patent: May 25, 2021

(54) REUSABLE POROUS NA(SIAL)O6.XH2O/NIFE2O4 STRUCTURE FOR SELECTIVE REMOVAL OF HEAVY METALS FROM WASTE WATERS

(71) Applicant: Mohsen Padervand, Maragheh (IR)

(72) Inventor: Mohsen Padervand, Maragheh (IR)

( * ) Notice: Subject to any disclaimer, the term of this patent is extended or adjusted under 35 U.S.C. 154(b) by 756 days.

(21) Appl. No.: 15/853,694

(22) Filed: Dec. 22, 2017

(65) Prior Publication Data

US 2019/0193066 A1 Jun. 27, 2019

(51) Int. Cl.
| | |
|---|---|
| *B01J 37/02* | (2006.01) |
| *B01J 37/04* | (2006.01) |
| *B01J 37/06* | (2006.01) |
| *B01J 37/34* | (2006.01) |
| *B01J 37/00* | (2006.01) |
| *B01J 20/18* | (2006.01) |
| *B01J 20/02* | (2006.01) |
| *B01J 20/22* | (2006.01) |
| *B01J 20/28* | (2006.01) |
| *B01J 20/32* | (2006.01) |
| *B01J 29/064* | (2006.01) |
| *C07F 7/18* | (2006.01) |
| *C02F 1/28* | (2006.01) |
| *C02F 103/34* | (2006.01) |
| *C02F 101/20* | (2006.01) |
| *C02F 1/36* | (2006.01) |

(52) U.S. Cl.
CPC ....... *B01J 37/0213* (2013.01); *B01J 20/0225* (2013.01); *B01J 20/186* (2013.01); *B01J 20/22* (2013.01); *B01J 20/28009* (2013.01); *B01J 20/3293* (2013.01); *B01J 29/064* (2013.01); *B01J 37/009* (2013.01); *B01J 37/0027* (2013.01); *B01J 37/04* (2013.01); *B01J 37/06* (2013.01); *B01J 37/343* (2013.01); *C02F 1/281* (2013.01); *C02F 1/288* (2013.01); *C07F 7/1804* (2013.01); *C02F 1/36* (2013.01); *C02F 2101/20* (2013.01); *C02F 2103/34* (2013.01)

(58) Field of Classification Search
CPC .... B01J 37/0213; B01J 20/0225; B01J 20/22; B01J 20/186; B01J 20/28009; B01J 20/3293
See application file for complete search history.

(56) References Cited

U.S. PATENT DOCUMENTS

| | | |
|---|---|---|
| 3,740,331 A | 6/1973 | Anderson |
| 3,821,351 A | 6/1974 | Lucid |
| 4,612,122 A | 9/1986 | Ambrus et al. |
| 4,935,147 A | 6/1990 | Ullman et al. |
| 5,525,315 A | 6/1996 | Burke |
| 5,817,239 A | 10/1998 | Tavlarides et al. |
| 5,855,790 A | 1/1999 | Bradbury et al. |
| 6,896,815 B2 | 5/2005 | Cort |
| 7,153,435 B2 | 12/2006 | Prenger et al. |
| 8,043,510 B2 | 10/2011 | Tullos et al. |
| 9,987,617 B1 * | 6/2018 | Naushad ................ C02F 1/288 |

FOREIGN PATENT DOCUMENTS

| | | |
|---|---|---|
| EP | 0302293 A1 | 7/1988 |
| EP | 0522856 A1 | 7/1992 |
| GB | 2170736 A | 12/1984 |
| WO | 2001002304 A1 | 1/2001 |

* cited by examiner

*Primary Examiner* — Yong L Chu
(74) *Attorney, Agent, or Firm* — Azadeh Saidi

(57) ABSTRACT

The 3-Glycidoxypropyltrimethoxysilane (GPTMS) decorated magnetic more-aluminosilicate shell $Na(Si_2Al)O_6 \cdot xH_2O/NiFe_2O_4$ structures were hydrothermally prepared and were well characterized by different analysis methods. The XRD patterns were truly proved the formation of the aluminosilicate layer on the surface of the magnetic cores. In addition to the TGA curve which implied on the presence of the GPTMS organic segment, nitrogen adsorption-desorption isotherms demonstrated that the final sample has high specific surface area. The products were incredibly able to remove the toxic lead and cadmium ions from the wastewaters. Furthermore, the mechanism of the sorption and the role of GPTMS in enhancing the sorption capacity of the structures were comprehensively discussed.

7 Claims, 5 Drawing Sheets

REUSABLE POROUS NA(SIAL)O6.XH2O/NIFE2O4 STRUCTURE FOR SELECTIVE REMOVAL OF HEAVY METALS FROM WASTE WATERS

BACKGROUND OF THE INVENTION

Water purification through removing heavy metal and other ionic organic agents like surfactants is one of the preliminary tasks required for environmental clean-up. Outlet water from the industrial activities contains quantities of many types of the soluble and insoluble materials which it would be uneconomic and dangerous for the ecosystem, and it is therefore desirable to be able to eliminate selectively the toxic agents in question. Heavy metal ions and the others waste water have been removed from polluted waters using a wide range of methods such as solvent extraction, precipitation, vacuum evaporation, membrane technologies, ionic exchange and adsorption (U.S. Pat. No. 4,612,122, A, U.S. Pat. No. 5,525,315, A, U.S. Pat. No. 5,817,239, A, 3,821,351, A).

As a very common method in water treatment, the toxic constituent is removed by absorbing onto the channels and pores of a porous sorbent or converting it to a solid compound which makes it possible to be removed by settling and filtering. However, in this way there are always considerable issues. For example, the filtration of small particles and the suspension-like medium is normally difficult and energy intensive.

Selective removal of the ions from the polluted waters is established as an ion exchange-based technique to delete the selected undesired particles from wastewaters, in which the ions are held by organic agents attached to a solid organic or inorganic support. Here, the binding route is typically affected by the acidity of the solution. Magnetic treatment of the wastewaters by using various solid systems has been previously reported.

U.S. Pat. No. 6,896,815, B2 developed a two-step chemical precipitation method involving hydroxide and sulfide precipitation combined with "magnetic field separation" technology toward removal of the non-chelated heavy metals. This technique with some modification was developed in U.S. Pat. No. 3,740,331. In this patent, Anderson reported that removing the heavy metals by using ferrous with sulfide will result in better heavy metal removal than the former case.

WO 2001002304 A1 describe a method based on filtration using a sedimentation chamber included sand particles bed for the removal of pesticides and heavy metals from the raw water.

U.S. Pat. No. 4,935,147 describes the purification of the liquid medium using magnetic materials coupled with an extra agent which fastens the removing of non-magnetic impurities via a reversible chemical binding.

EP 0302293 demonstrates a method for purification of the solutions by using modified magnetic granules which were prepared by mixing and pressing the wet precursors. Here, absorption is the basic step of the removing process.

EP 0522856 and U.S. Pat. No. 5,855,790 described using polymeric composites including magnetic ingredients for clarification of wastewaters. These methods were based on chelating ion exchange function of the structures to eliminate the ionic pollutants.

Another one, GB 2170736 described the capacity of the sulphide-functionalized magnetic particles toward removing the heavy metal ions.

U.S. Pat. No. 7,153,435, B2 discussed developing a method by means of magnetite and magnetic structures which remove the heavy metals via binding to the surface of these functionalized solid matrixes.

Treating the mercury contained wastewater toward its purification from the heavy metal ions was reported in U.S. Pat. No. 8,043,510, B2. The process is based on attracting the mercury ions onto the active outer surface of the prepared magnetically separable particles.

SUMMARY OF THE INVENTION

In view of the forgoing, it is an object of this invention to present new high capacity reusable magnetic core-aluminosilicate shell sorbents to selective purification of the wastewaters contained heavy metal ions.

The unique and homogonous growth of a porous layer of hydrated aluminosilicate particles on the surface of magnetic particles is another object of the present invention.

It is also an object of this invention to introduce a suitable modifying organic agent to achieve the highest removal efficiency of the heavy metals.

The present invention provides magnetic particles compromise $NiFe_2O_4$ core surrounded by a large pore $Na(Si_2Al)O_6 \cdot xH_2O$ inorganic shell which the inner surface of the channels and pores was decorated by an organic agent (GPTMS) for increasing the sorption capacity toward removal of the heavy metal ions of cadmium and lead.

Using of nickel ferrite with high magnetic saturation value as core made the final products promising reusable sorbents for subsequent removal of the toxic heavy metal ions.

The other components of the samples in the present invention are porous $Na(Si_2Al)O_6 \cdot xH_2O$ inorganic shell with the average pore size of 0.32 nm, which promotes the selective removal of the cadmium ions (radius size of 0.095 nm) in comparison with the lead ones (radius size of 0.119 nm), and GPTMS modifying agent which introduced into the channels of the outer aluminosilicate shell.

Such promising reusable sorbents could be the main components of the membranes for purifying industrial wastes before their entrance to the ecosystem.

Figure 1:
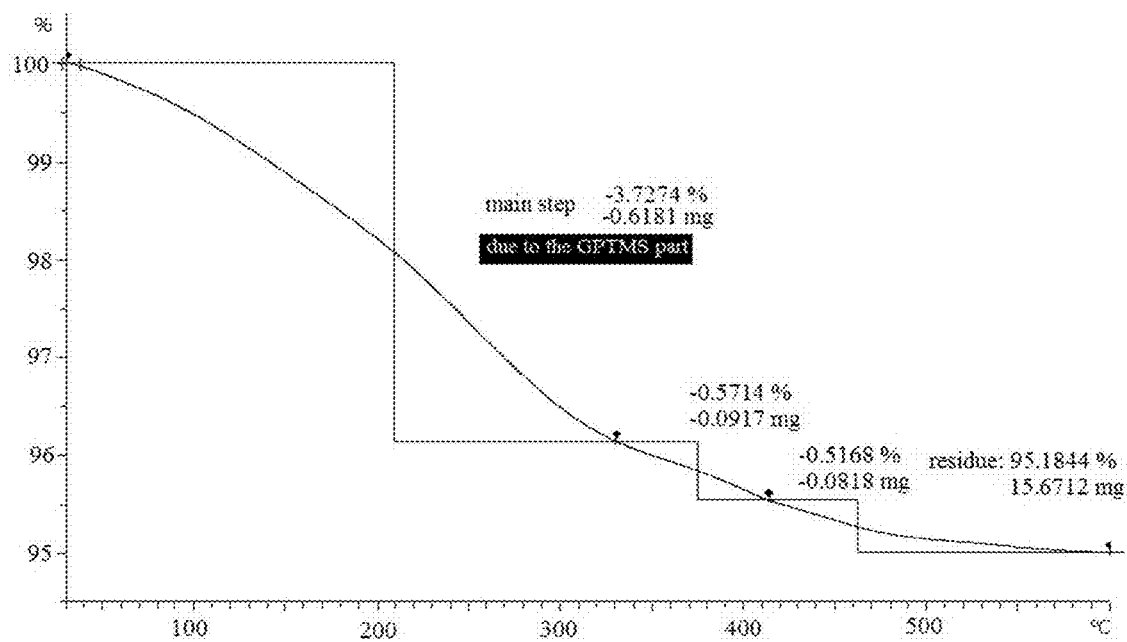
FIG. 1 is the results of the TGA analysis for the final product and was very helpful to be sure of the organic decoration process.

DETAILED DESCRIPTION OF THE INVENTION $NiFe_2O_4$ particles were prepared by a simple coprecipitation-hydrothermal method in a 200 ml stainless steel autoclave with a Teflon liner under autogenous pressure as following: a 50 ml transparent solution containing $Ni(NO_3)_2$ and $FeCl_3$ (corresponding to $Ni^{2+}/Fe^{3+}$ molar ratio of 1:2) was prepared and added to NaOH solution 2 M drop by drop under vigorous stirring. Afterward, a mixture contained suitable amount of EG and TMAOH was added to the above suspension drop wise. After 2 h of stirring, the mixture was immediately transferred into the autoclave and kept at 200° C. for 8 h and then the black solid particles were collected by an external magnet, repeatedly washed with de-ionized water, and dried 80° C. for 6 hrs.

The $Na(Si_2Al)O_6.xH_2O/NiFe_2O_4$ particles were also prepared as following: $Al(NO_3)_3.9H_2O$ was dissolved in 30 mL of NaOH 2 M contained 0.9 g of cetyl trimethylammonium bromide (CTAB) and 5.05 mL of tetraethyl orthosilicate (TEOS) and then magnetically stirred for 90 min. Magnetic particles (1.0 g) was dispersed in 35 mL of water, ultrasonicated for 20 min, and then added to the earlier suspension. After 24 h of stirring, the reluctant mixture was immediately transferred to a 200 mL autoclave and maintained in a preheated oven at 423 K for 48 h. after the completion of the reaction, the product were magnetically separated, washed with double distilled water, and dried at 353 K overnight. Finally, the powder calcined at 773 K for 3 h.

Outer shell of the $Na(Si_2Al)O_6.xH_2O/NiFe_2O_4$ particles were then modified with 3-glycidoxypropyltrimethoxysilane (GPTMS) in the basic medium. The as-prepared samples were dispersed in NaOH solution 0.1 M and ultrasonicated for 10 min. The suspension was transferred into a flask bottle placed in 20° C., and GPTMS was slowly added while vigorously being stirred and treated at 65° C. for another 2 h. Finally, the resulting product was separated with the help of the permanent magnet, washed thoroughly with distilled water, and dried at 80° C.

The removal tests were carried out in a 1 L batch reactor with the initial X(II) concentration (X=Pb and Cd) of 20 mg/L at the initial pH value 5. The sorbent mass was fixed at 0.1 g. The reactor was stirred with a magnetic stirrer operated at 300 rpm. At predetermined time intervals, 3 mL samples were taken from the reactor, centrifuged and residual X(II) concentration was measured with an atomic absorption spectrophotometer (AAS). By performing appropriate material balance, the quantity of X(II) adsorbed at the selected time intervals was determined and used for kinetic analysis.

The TGA curve of the final product depicts a significant weight loss from room temperature up to around 250° C. which can be attributed to the removal of GPTMS agents intercalated in the aluminosilicate pores (FIG. 1). We also observed two insignificant losses which probably are due to release strongly bonded extra organic components into the core-shell structure.

Figure 2:
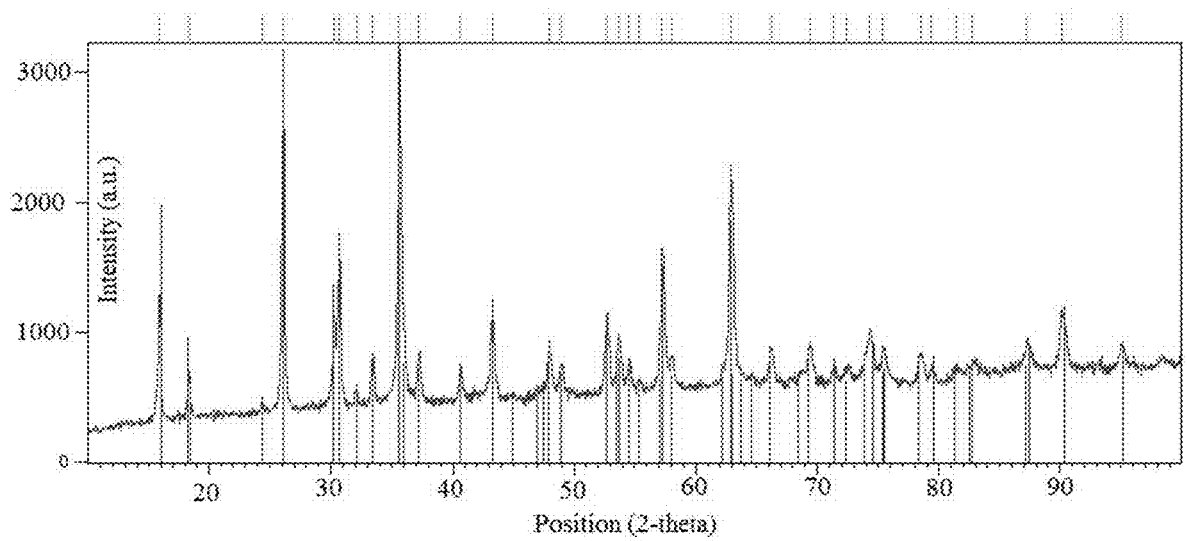
FIG. 2 is the XRD pattern of the final product which showed the crystalline phase of the core-shell segments.

The XRD pattern of the final sample is shown in FIG. 2. These patterns were recorded on Bruker D8 advance X-ray diffractometer with CuK$\alpha$ irradiation ($\lambda$=0.15406). The sharp peaks at 2$\theta$=30.2°, 35.1°, 44.2°, 90.6° and all the others remarked with red-like color are attributed to the crystal phase of the nickel ferrite magnetic particles. Hydrated aluminosilicate characteristic peaks can be observed at 2$\theta$=16.7°, 26.2°, 30.9°, 41°, and all other remarked with green color. And there was no observed any extra peak in the XRD patters after surface modification process with GPTMS, as we also didn't expect to see any change after doing this section.

Figure 3:
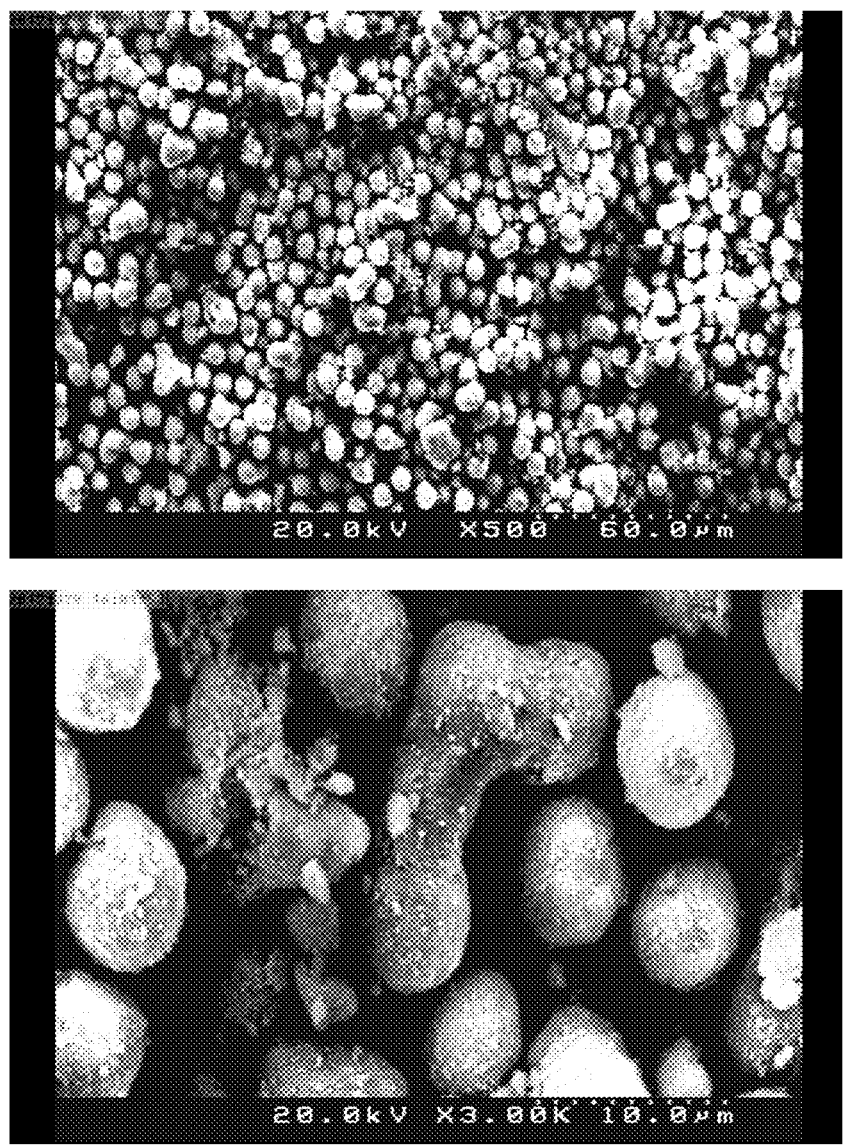
FIG. 3 is the SEM images of the final spherical product.

Braun Emmett Teller (BET)-Barrett-Joyner-Halenda (BJH) analysis was carried out to find the specific surface area and the pore size distribution of the final spherical core-shell particles which its SEM images are shown in FIG. 3. According to the SEM micrographs, the prepared samples have unique and spherical shape and the particles size are between 5-10 $\mu$m. The results of BET analysis showed that the specific surface area and the pore size were 230.1 $m^2 g^{-1}$ and 0.32 nm, respectively. The observed hysteresis loop from the $N_2$ adsorption-desorption curve was also proved that the sample is highly porous.

Figure 4:
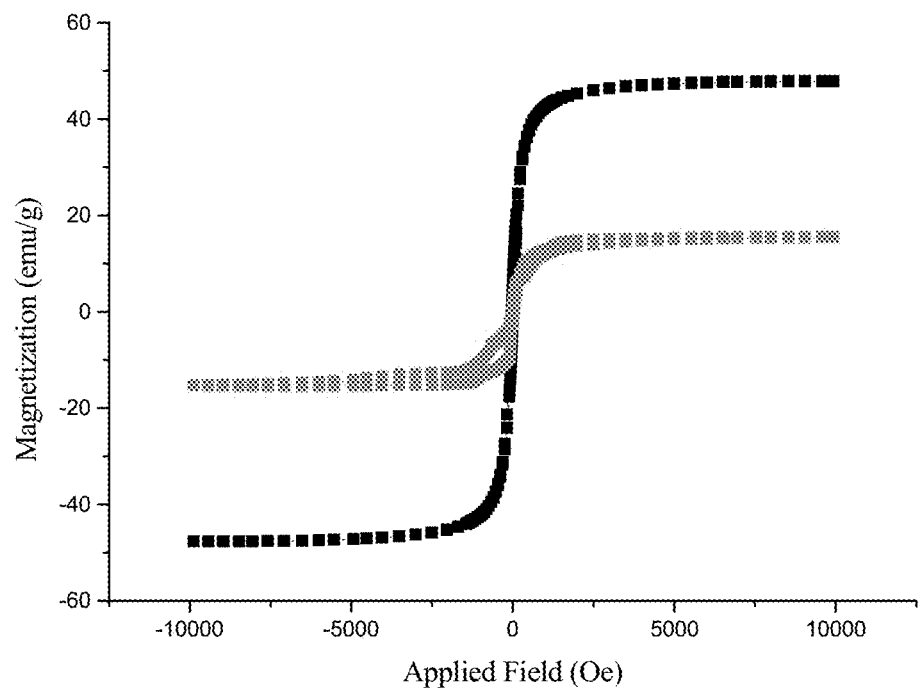
FIG. 4 is the results of the VSM analysis method and shows that the magnetic saturation has decreased significantly by surface modification and layer growth.

The magnetic properties of the structures were measured by Vibrating Sample Magnetometer (VSM) and the results are indicated in FIG. 4. According to the obtained results, magnetic particles and final sample have the magnetic saturation values of 48.5 and 10.8 emu/g, respectively, which verify that the final products have still high magnetization and they are easy to separate after reusing. This is so important for reusing the sorbent during the subsequent treatment of the wastewater contained heavy metals.

Figure 5A:
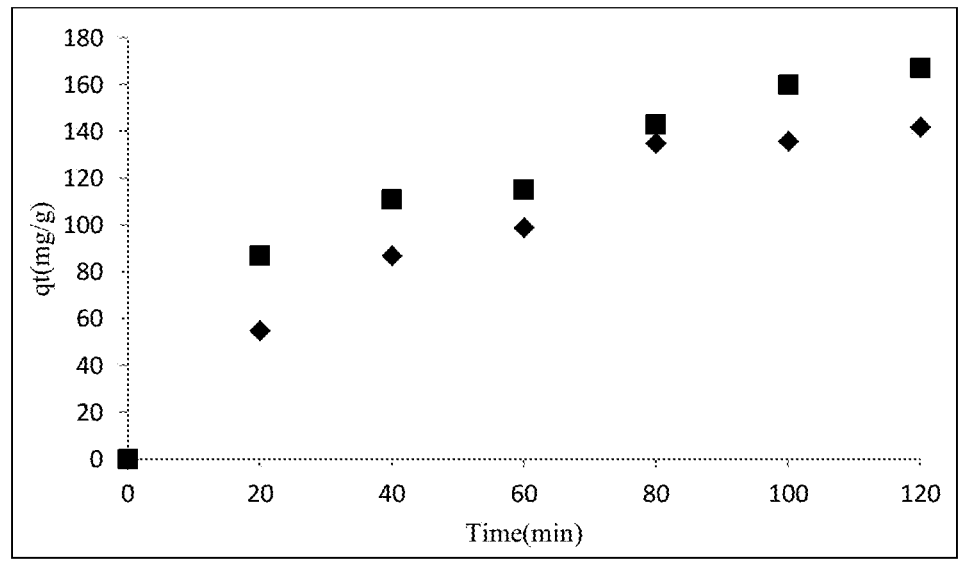
FIG. 5A is the removal of cadmium and lead ions from the wastewater over the final products.
Figure 5B:
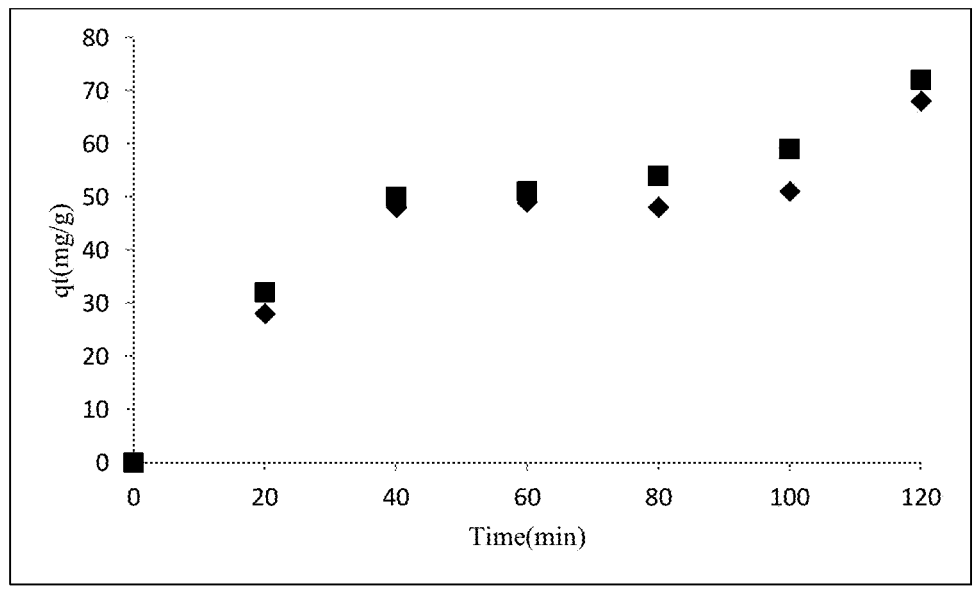
FIG. 5B is the removal of cadmium and lead ions from the wastewater over the unmodified $Na(Si_2Al)O_6 \cdot xH_2O/NiFe_2O_4$ structure.

The sorption curves of $Pb^{2+}$ and $Cd^{2+}$ over the prepared products are shown in FIG. 5. While the removal efficiency is less over unmodified $Na(Si_2Al)O_6.xH_2O/NiFe_2O_4$ sample, the results demonstrated that the decoration of the porous shell with GPTMS increased it significantly even though this modification with organic agent reduced the specific surface area smoothly. The metal ions of the hydrated aluminosilicate channels ($Na^+$) could be exchanged with the present ions in the wastewater.

Figure 6:
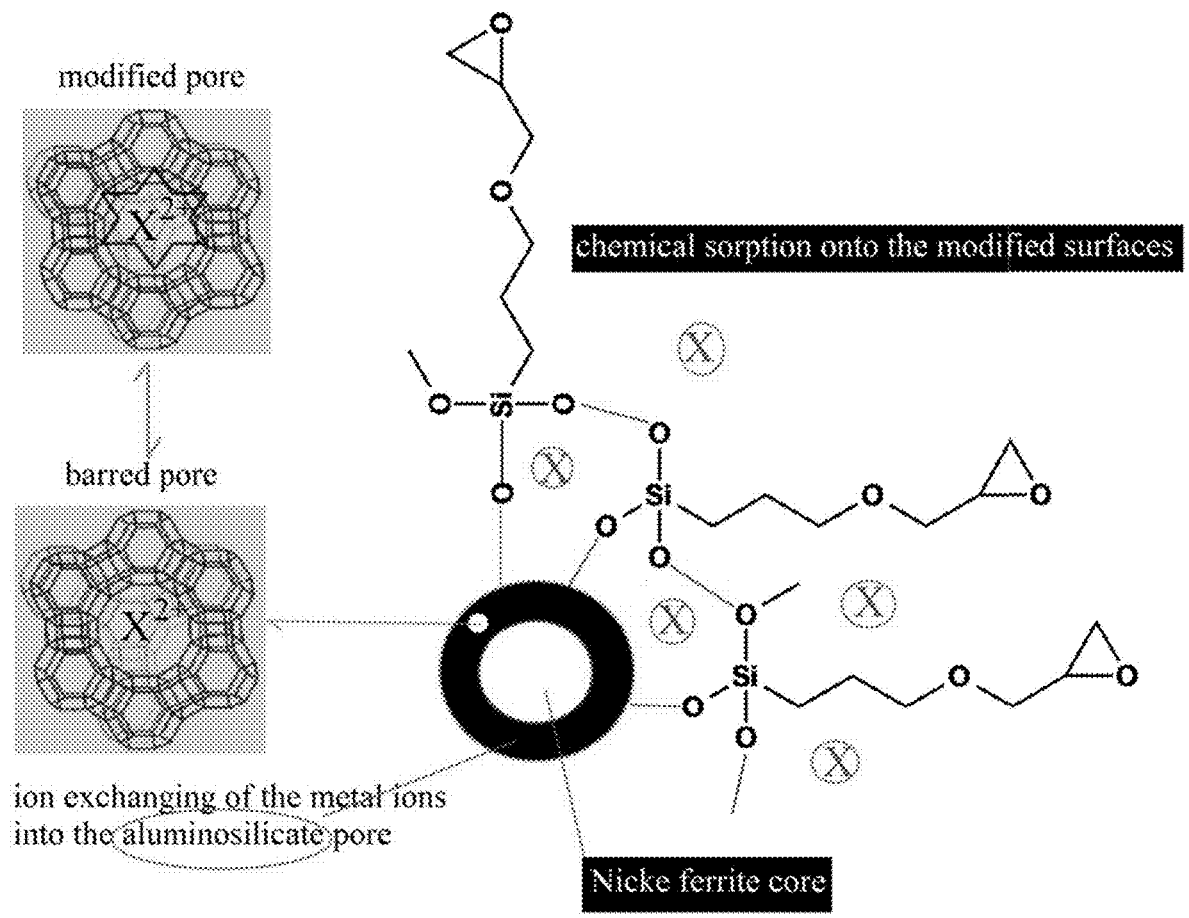
FIG. 6 is the likely routes for removal of heavy metal ions over the final product.

As the final product is used as sorbent, in addition to the mentioned case, the heavy metal ions could be chemically trapped into the GPTMS-decorated pores of the surface via chemical sorption. It can be observed in all cases, the removal efficiency of $Cd^{2+}$ is higher than $Pb^{2+}$ ions. The radius size of $Cd^{2+}$ (95 pm) is less than $Pb^{2+}$ (119 pm) which makes it more suitable for effective ion exchange and also more effective bonding with organic groups on the surface. Even though, the presence of the GPTMS organic layer on the surface can block some channels and causes to reduce the surface area insignifacntly, the chemical sorption of the first layer and the physical sorption of the next layers on the surface would be likely. Thus, the highest removal is achieved with the modified structure. FIG. 6 explained schematically the overall route of the heavy metal ions removal over the products.

Figure 7:
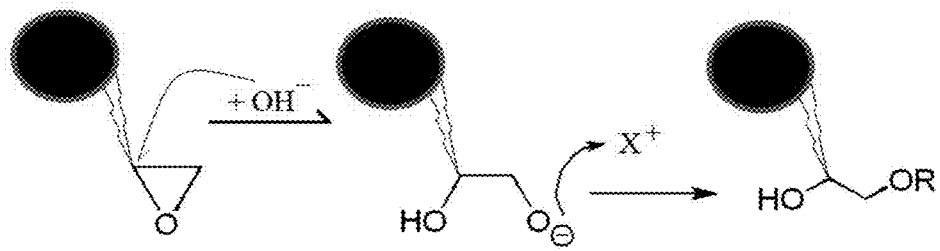
FIG. 7 is the representative effect of epoxy cycle opening on the removal efficiency.

As an extra study, we found that the removal efficiency enhanced when the initial pH of the medium was increased. The pH of the aqueous solution is an important operational parameter in the adsorption process because it affects the solubility of the metal ions, concentration of the counter ions on the functional groups of the adsorbent and the degree of ionization of the adsorbate during reaction. The active sites on an adsorbent can either be protonated or deprotonated depending on the pH while at the same time the adsorbate speciation in a solution depends on the pH too. Lead for example, exists as $Pb^{2+}$, $PbOH^+$ and $Pb(OH)^-_3$ depending on pH. Hydrated aluminosilicates are highly selective for $H_3O^+$ ions when they are predominant in the solution. Thus, at lower pH values the $H_3O^+$ ions compete with the metal ions for exchanging in the channels. Moreover, the ethylene oxide functional group of GPTMS on the surface affected in high pH and increases the chemical sorption via the below mechanism (FIG. 7):

The materials easily separated from the medium by an external magnetic field after the first treatment time, washed with a NaCl solution, dried, and reused repeatedly. This study showed that the sorption capacity under the same conditions for the next times decreased smoothly. If one takes the maximum sorption capacity of the final product 100% during the first time, it reduces to 93, 89, 78, 78, and 73% during the next usages. This decease can attribute to the detachment of GPTMS agents during the repeated using which fades out the chemical sorption route of the heavy metal ions over the sorbent.

Sorption activity of the sample is greatly dependent of the media acidity and should be optimized to get the best efficiency. The effect of the epoxy cycle of GPTMS segment on increasing the removal efficiency was mechanistically discussed. The final product indicated promising capacity during the recycling experiments of the purification of the heavy metal-contained wastewaters.

What is claimed is:

1. A method of making a high capacity reusable magnetic core-aluminosilicate shell sorbent for selective purification of wastewaters containing heavy metal ions, comprising the steps of preparing magnetic cores ($NiFe_2O_4$):
   a) preparing 50 ml of transparent solution containing $Ni(NO_3)_2$ and $FeCl_3$ (corresponding to $Ni^{2+}/Fe^{3+}$ molar ratio of 1:2);
   b) adding said transparent solution of step a) to NaOH solution 2 M drop by drop under vigorous stirring;
   c) adding a mixture containing sufficient amounts of ethylene glycol (EG) and tetramethyl ammonium hydroxide (TMAOH) to the solution of step b) drop wise;
   d) stirring the above combined mixture in step c) for 2 hrs, then immediately transferring it into an autoclave and keeping it at 200° C. for 8 hrs;
   e) collecting black solid particles by an external magnet, repeatedly washing said particles de-ionized water, and drying them at 80° C. for 6 hrs.

2. The method of claim 1, further comprising the steps of preparing $Na(Si_2Al)O_6.xH_2O/NiFe_2O_4$ particles as follows:
   f) dissolving $Al(NO_3)_3.9H_2O$ in 30 mL of NaOH 2 M containing 0.9 g of cetyltrimethylammonium bromide (CTAB) and 5.05 mL of tetraethyl orthosilicate (TEOS);
   g) magnetically stirring the solution step f) for 90 min;
   h) dispersing 1.0 g of said black solid magnetic particles in step e) in 35 mL of water; and ultrasonicating it for 20 min;
   i) combining said mixture obtained from step g) with said black solid magnetic particles suspension of step h), and stirring them for 24 hrs;
   j) immediately transferring the above mixture to a 200 mL autoclave and maintaining it in a preheated oven at 150° C. for 48 hrs, in order to complete all the necessary reactions;
   k) after completion of said reaction, then magnetically separating the product in step J), washing it with double distilled water, and drying it at 80° C. overnight, grinding the product creating powder; wherein said powder is then calcined at 500° C. for 3 hrs.

3. The method of claim 2, further comprising the following steps:
   l) outer shell of said $Na(Si_2Al)O_6.xH_2O/NiFe_2O_4$ particles are modified with 3-glycidoxypropyltrimethoxysilane (GPTMS) in a basic medium;
   m) dispersing as-prepared samples in NaOH solution 0.1 M and ultrasonicated for 10 min;
   n) transferring suspension of step m) into a flask bottle placed in 20° C., and said GPTMS is slowly added while vigorously being stirred and treated at 65° C. for another 2 hrs;
   o) separating the resulting product with a permanent magnet, washed thoroughly with distilled water, and dried at 80° C.; therefore successfully growing Porous aluminosilicate shell layer on a surface of nickel ferrite particles by hydrothermal crystallization.

4. The method of claim 3, wherein SEM analysis shows a homogeneous formation of spherical aluminosilicate shell on said surface of nickel ferrite cores.

5. The method of claim 4, wherein an Inner surface of channels of said inorganic porous shells are successfully decorated with GPMTS organic agent.

6. The method of claim 5, wherein said final decorated $Na(Si_2Al)O_6.xH_2O/NiFe_2O_4$ product shows great capacity toward selective removal of heavy metal ions from said wastewaters.

7. The method of claim 6, wherein said final product shows higher tendency and efficiency, for removal of cadmium ions than the lead ones.

* * * * *